Dec. 23, 1958

G. CAILLETTE 2,865,579

JET PROPULSION SYSTEM FOR MAINTAINING
AIRCRAFT IN A VERTICAL ATTITUDE

Filed Jan. 23, 1956

Inventor
G. Caillette

United States Patent Office 2,865,579
Patented Dec. 23, 1958

2,865,579

JET PROPULSION SYSTEM FOR MAINTAINING AIRCRAFT IN A VERTICAL ATTITUDE

Georges Caillette, Neuilly-sur-Seine, France

Application January 23, 1956, Serial No. 560,840

Claims priority, application France January 28, 1955

2 Claims. (Cl. 244—52)

The present invention relates to aerodynes which are propelled by means adapted to create thrusts and, more particularly, to aerodynes of the type described in the application, filed by applicant, in U. S. A., on July 23, 1952, for "Aircraft," Ser. No. 300,463, i. e., aerodynes wherein the resultant thrust intersects the axis of the aerodyne at a point located ahead of its centre of gravity, as considered in the direction of progression of the aerodyne under the action of said resultant thrust.

Such areodynes are adapted to take off and to land vertically and also to evolve in a stable manner in any direction. It is known, however, that this stability is particularly difficult to be obtained when the velocity of the aerodyne is near zero and when the latter is subjected to wind action, i. e., actually at the moment of landing.

The object of the invention is to provide an improved aerodyne of the aforesaid type which is able to land in a stable manner, even under windy conditions.

In the attached drawings in which the same reference character denotes the same or similar part:

Figures 1, 2, 3, 4:
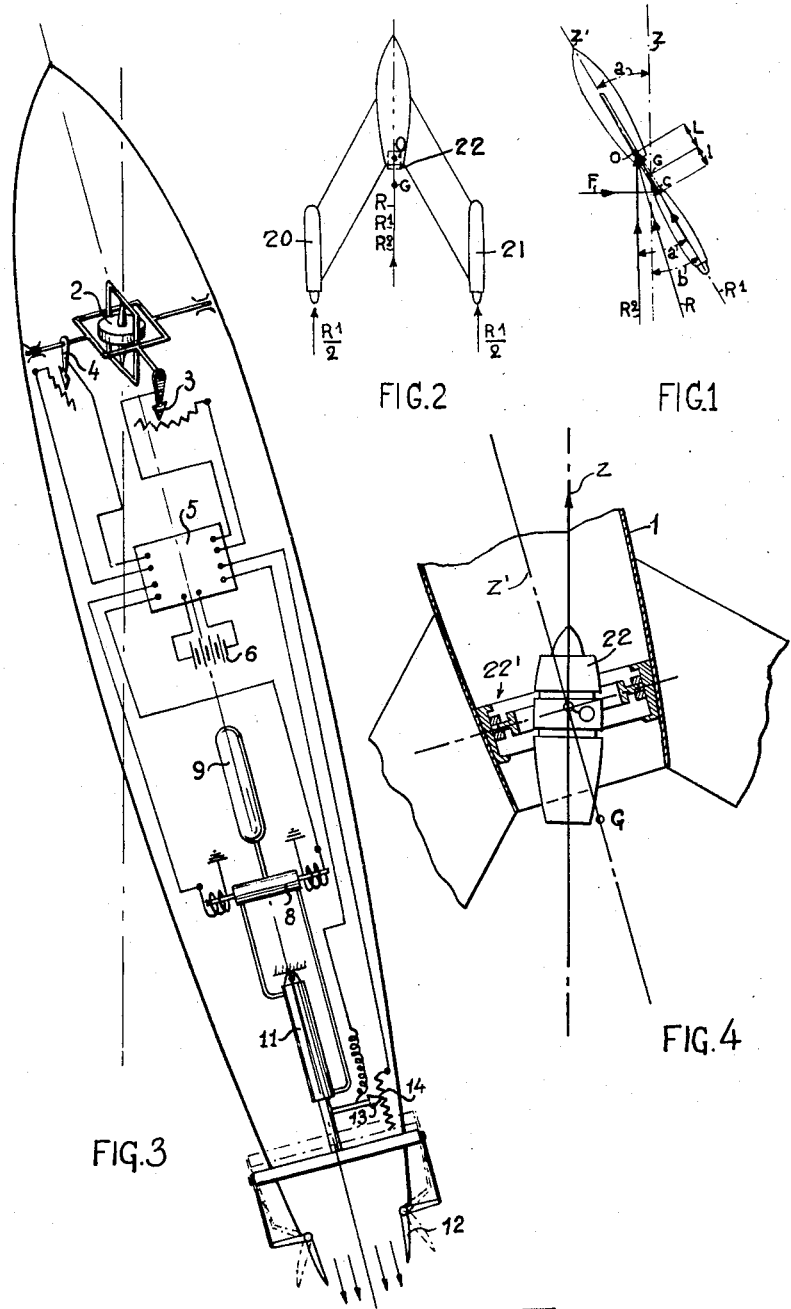
Fig. 1 is an elevational view showing the outline of an aerodyne together with the forces involved.
Fig. 2 is a plan view showing the outline of the aerodyne together with the forces involved.
Fig. 3 is a diagrammatic representation of one of the rear jet propulsion units.
Fig. 4 is an enlarged fragmental view, partly in cross-section of the mounting means for the centrally located jet propulsion unit.

In order that the following should be better understood, reference will be had to Figures 1 and 2 of the accompanying drawings which show the outline of an aerodyne together with the forces involved. It is understood, of course, that this aerodyne could assume any other suitable shape.

The aerodyne or flying body comprises three jet propulsion units 20, 21 and 22 positioned on the areodyne in such a manner with respect to the longitudinal axis G—Z of the aerodyne passing through the center of gravity G thereof that the resultant thrust line R of said three propulsion units coincides with said axis to thereby apply a forward thrust to said aerodyne.

The propulsion units 20 and 21 develop each a forward thrust, the resultant thrust line R1 of which coincides with the axis G—Z of the aerodyne and the propulsion unit 22 is positioned on the aerodyne 1 in such a manner that its thrust line R2 may be angularly adjusted so as to either coincide with axis G—Z or to intersect said axis at a point O located at a distance L ahead of the center of gravity G. Such an arrangement enables the aerodyne to evolve in a stable manner in any direction of the space.

With reference to Fig. 4 which illustrates the means whereby the propulsion unit 22 is allowed to pivot with respect to the aerodyne 1 such that the thrust line R2 may be maintained vertically downward, it will be seen that the unit 22 is mounted on the aerodyne 1 by means of a conventional gimbal connection denoted 22'. It is believed obvious to one skilled in the art that suitable control means (not illustrated) are provided to make the angular position of the propulsion unit 22 dependent upon a predetermined direction in space (vertical). For example, the position of the propulsion unit with respect to the aerodyne 1 may be adjusted about the two axes of the gimbal connection 22' by means of two servo motors controlled by a conventional pick-up device, as the same has been disclosed in application Serial No. 300,463.

Furthermore, in lieu of the gimbal connection shown in Fig. 4, it is possible to employ movable deflector means arranged to deflect the jet R2 in the desired direction.

In the aforesaid application, means have been indicated for securing such requirements in the arrangement of the lines of action of the jet engines mounted on an aerodyne.

The thrust or resultant thrust designated by $R_1$ and $R_2$, in practice, may be the resultant forces created by several propulsion forces or groups of propulsion forces supplied for instance by the gases discharged from jet engines mounted on the aerodyne. In the example illustrated, the thrust $R_2$ is supplied by a single jet engine 22 located at point O and the direction of which is adjustable, while the resultant thrust $R_1$ is equal to the sum of both forces $$\frac{R1}{2}$$

supplied by both jet engines 20 and 21 arranged at the wing tips of the aerodyne in a direction parallel with the axis of the aerodyne.

The aerodyne or flying body 1 has a structure such that its center of pressure $c$, on which acts the horizontal resultant force F of the wind, is located on axis G—Z at a distance 1 behind the center of gravity G.

In the following description and in the claims, it is understood that every time a point is said to be located ahead of or behind the centre of gravity of the aerodyne, this means in the direction of progression of said aerodyne under the action of its propelling means.

Assuming that the thrust forces developed by the propulsion units 20, 21 and 22 are adjusted so as to maintain the aerodyne 1 immovable in space in a position in which the direction of axis G—Z is parallel to the vertical, it will be understood that, in the absence of any other dynamical force as well as in the absence of the inertia force, the horizontal resultant force F of the wind applied at point $c$ of the aerodyne will produce a turning moment on the aerodyne about a horizontal transverse axis thereof passing through the center of gravity G in a direction perpendicular to that of the wind, said turning moment tending to change the direction of axis G—Z in respect to the vertical so that axis G—Z will form with the vertical an angle $a$.

Now, when the angularly adjustable direction of thrust R2 is maintained parallel to the vertical and when, under the action of force F on point $c$, the axis G—Z should form an angle $a$ with the vertical, it will be understood that the thrust line R2 will then intersect the axis G—Z at the point O to thereby produce a turning moment on the aerodyne 1 tending to counteract the turning moment produced by force F so as to bring axis G—Z anew in parallelism with the vertical.

The weight of the aerodyne is P.

The aerodyne 1 will be maintained in equilibrium about the above-mentioned transverse axis passing through the center of gravity G when the resultant of all the forces applied to the aerodyne is zero, and when the sum of the turning moments produced by said forces and tending to turn the aerodyne about said transverse axis is also zero.

In other words, a state of stable equilibrium of the aerodyne is obtained when:

(a) the horizontal resultant of the forces is zero:

$$F - R_1 \sin a = 0 \quad (1)$$

(b) the vertical resultant of the forces is zero:

$$P - R_1 \cos a - R_2 = 0 \quad (2)$$

(c) the turning moment about said horizontal transverse axis is zero:

$$R_2 L \sin \alpha - F1 \cos a = 0 \quad (3)$$

When the axis G—Z of the aerodyne is in parallelism with the vertical, that is, when angle $a$ is zero, the force $R_1$ has a determined value designated by $R_{1_0}$. The values of $R_{1_0}$ and $R_2$ are determined as follows:

$$R_{1_0} = \frac{PL}{1+L}$$

and $$R_2 = \frac{P1}{1+L}$$

$$P = R_{1_0} + R_2$$

and $$\frac{R_{1_0}}{L} = \frac{R_2}{1}$$

the value of $R_1$ being varied in accordance with the magnitude of angle $a$.

Bringing the values of $R_{1_0}$, $R_2$ and $R_1$ into the equations, the above requirements are satisfied when in (1) $a$ corresponds to:

$$\sin a = \frac{F}{R_1}$$

and $$\text{tg } a = \frac{F}{R_{1_0}}$$

since this value fulfills the Equations 1 and 3, the relation (2) being verified by definition. In fact, if F in Equation 3 is replaced by its value $F = R_{1_0} \text{tg } a$, there is obtained:

$$R_2 L \sin a - R_{1_0} tga1 \cos a = 0$$

and $$\frac{R_{1_0}}{L} = \frac{R_2}{1}$$

or $$R_{1_0} 1 = R_2 L$$

which represents the ratio of definition of the forces $R_{1_0}$ and $R_2$.

From the foregoing, it results that, in order to provide for stability of the aerodyne in the course of vertical take-off or vertical landing, it is sufficient that the following three requirements should be met.

1. To constitute the aerodyne in such a manner that $$R_2 = R_{1_0} \cdot \frac{1}{L}$$

In order to obtain this result, it is necessary, on one hand, to define the position of the centre of thrust (c) of the aerodyne relative to its centre of gravity (G) (distance $cG = 1$) when said aerodyne turns a predetermined face to the wind, which is obtained by a wing structure of suitable shape which may be established at will, and, on the other hand, to provide propelling means such that their resultant force fulfills the aforesaid requirement:

$$R_2 = R_{1_0} \frac{1}{L}$$

2. To maintain the force $R_2$ in a vertical direction.

3. To make $R_1$ fulfill the Equation $$R_1 = \frac{R_{1_0}}{\cos a}$$

Apart from the constructional requirements, two functions are therefore to be obtained, namely maintaining the direction of $R_2$ in a vertical direction, a function which may be obtained by means already known such as those also indicated in the aforesaid application, and maintaining the strength of the force $R_1$ in inverse relation with the cosine of the angle $a$ between the aerodyne axis GZ' and the vertical.

In the course of the following description a practical embodiment of a jet area adjusting device mounted on each of the rear jet engines 20 and 21 for obtaining this second function will be described with reference to Fig. 3 which illustrates, by way of example, the outline of one of the rear jet engines 20 and 21 of the aerodyne capable of creating the thrust $$\frac{R_1}{2}$$

according to the diagram of Figure 1. The resultant force $R_1$ which has a fixed axial direction is a function of $\cos a$, as already seen hereinabove, whereas the resultant force $R_2$ has a constant strength and is maintained in a vertical direction.

In order to adjust the strength of the force $R_1$, use may be made for instance of a device which comprises, for each rear jet engine, a gyroscope 2 supported on a gimbal with two perpendicular pivoting spindles respectively connected to two rheostats or potentiometers 3, 4 one of which is adapted to record the angle $a$ which may be formed by axis G—Z and the vertical in one of two vertical planes containing said axis and lying at right angles to each other, and the other of which is adapted to record an angle which may be formed by the axis G—Z and the vertical in the other of said two planes. The instant positions of both rheostats 3, 4 are transmitted to an amplifier-mixer 5 connected, on one hand, to a source of current 6 and, on the other hand, to a slide valve 8. The slide valve 8 connects a pressure fluid accumulator 9 to a jack 11 acting on a device 12 of any suitable known type adapted to adjust the strength of the force $R_1$ by adjusting the cross-section of the outlet of the gas stream discharged out of the jet engine.

The movable member of the jack 11 is operatively connected to the sliding contact arm 13 of the rheostat 14 mounted in a circuit connected to the amplifier-mixer 5. Said arm 13 constitutes the controlled member of a follow-up system, so that, for each value of the angle $a$, i. e., for each configuration of the two rheostats 3 and 4, the adjusting device 12 assumes a predetermined position.

The whole assembly is arranged in such a manner that, for each value of the angle $a$ between the main axis of inertia of the aerodyne and the vertical, the adjusting device 12 adapted to adjust the strength of the resultant force $R_1$ assumes a predetermined position according to the relationship $$R_1 = \frac{R_{1_0}}{\cos a}$$

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

What I claim is:

1. In an aerodyne having a structure such that its center of pressure lies at a predetermined distance behind the center of gravity of the aerodyne and on a longitudinal axis thereof passing through said center of gravity, first jet propulsion means developing a thrust force and positioned on said aerodyne in such a manner that the resultant thrust line of said first propulsion means always coincides with said axis, second jet propulsion means developing a thrust force the resultant thrust line of which is angularly adjustable with respect to said axis and is always maintained vertical, said second propulsion means being positioned on said aerodyne in such a manner that said resultant thrust line of said second propulsion means either coincides with said axis when the latter is vertical or intersects said axis at a point located at a predetermined distance ahead of said center of gravity when said axis forms an angle with the vertical, and means for varying said thrust force of the first propulsion means in accordance with the magnitude of said angle.

2. An aerodyne according to claim 1, in which said means for varying said thrust force of the first jet propulsion means comprise a gyroscope measuring said angle formed by said axis of the aerodyne and the vertical, a device arranged to adjust the area of the jet produced by said first propulsion means to effect variations in the thrust thereof, a motor for actuating said device, electrically operated control means for said motor, a first pickoff at one axis of said gyroscope, a second pickoff at the other axis of said gyroscope, an amplifier-mixer connected to said first and second pickoffs and to said control means to operate said motor and thereby said jet adjusting device in response to the corrective input obtained from said pickoffs, and an electric follow-up system interconnected between said adjusting device and said amplifier-mixer.

References Cited in the file of this patent

UNITED STATES PATENTS

| | | |
|---|---|---|
| 2,396,568 | Goddard | Mar. 12, 1946 |
| 2,621,871 | Robert | Dec. 16, 1952 |

FOREIGN PATENTS

| | | |
|---|---|---|
| 580,995 | Great Britain | Sept. 26, 1946 |